United States Patent
Hubel et al.

[15] 3,670,237
[45] June 13, 1972

[54] APPARATUS FOR THE SMOOTH SWITCHING-ON OF AN ELECTRICAL LOAD

[72] Inventors: Egon Hubel, Nurnberg; Gerhard Hoeber, Ingolstadt, both of Germany

[73] Assignee: Schubert & Salzer Maschinenfabrik Aktiengesellschaft, Ingolstadt, Germany

[22] Filed: Dec. 16, 1970

[21] Appl. No.: 98,839

[30] Foreign Application Priority Data

Dec. 23, 1969 Germany ..................P 19 64 376.6

[52] U.S. Cl. .............................321/47, 318/230, 318/341, 318/416, 318/431, 323/24
[51] Int. Cl. ......................................................H02m 7/12
[58] Field of Search.................318/227, 230, 341, 416, 431; 323/24; 321/47

[56] References Cited

UNITED STATES PATENTS

| | | | |
|---|---|---|---|
| 3,307,093 | 2/1967 | Wright | 318/227 X |
| 3,486,101 | 12/1969 | Rufli | 318/431 |
| 3,500,174 | 3/1970 | Ellerbeck | 323/24 |
| 3,548,289 | 12/1970 | Liska et al. | 323/24 X R |
| 3,573,580 | 4/1971 | Shinozaki | 318/227 |
| 3,584,278 | 6/1971 | Krabbe | 318/227 X |

*Primary Examiner*—William M. Shoop, Jr.
*Attorney*—Robert W. Beach

[57] ABSTRACT

In apparatus for the smooth switching-on of an electrical load a supply line transformer feeds a rectifier having its output connected jointly with a synchronization stage and with a run-up or starting stage. Two such stages are connected to the outputs of the respective rectifiers, each of the stages including capacitor means, resistor means and selectors for varying the capacitor means and the resistor means, the capacitor means of the two stages being connected in series at a connection point for supplying a control voltage. A limiting value switch has its input connected with the limiting value switch and with an electrical load for controlling the voltage supplied to such electrical load.

13 Claims, 20 Drawing Figures

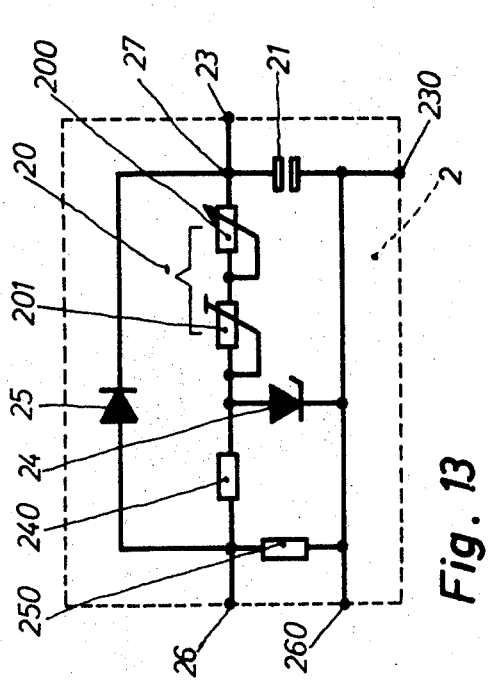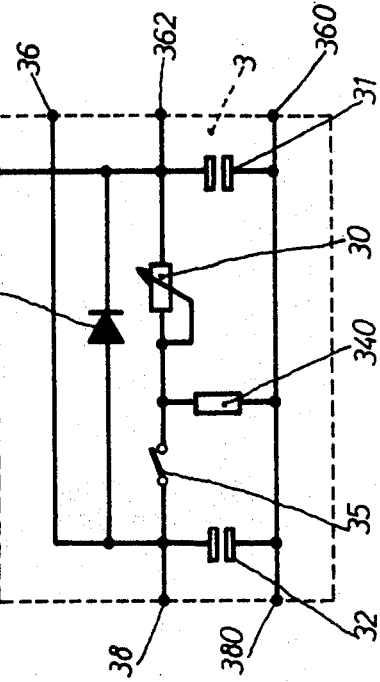

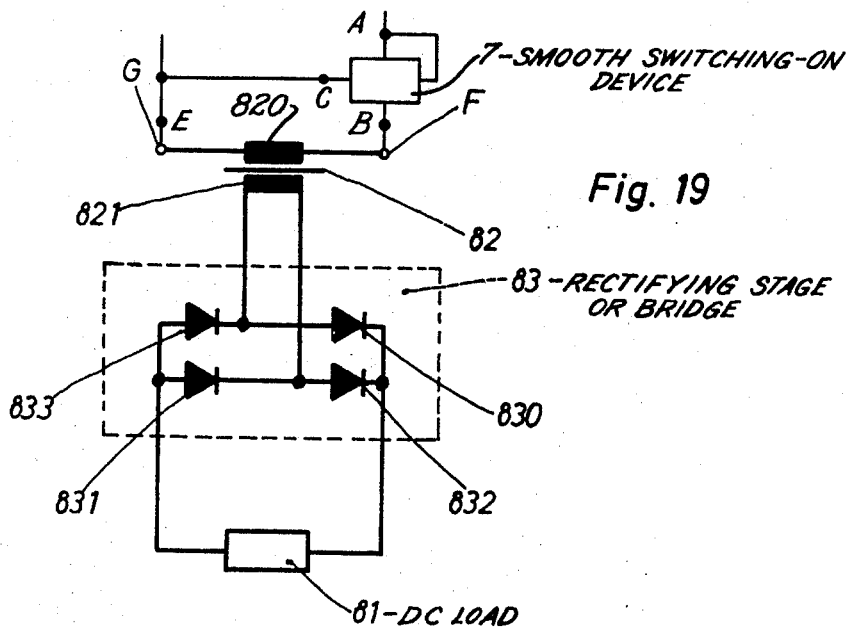
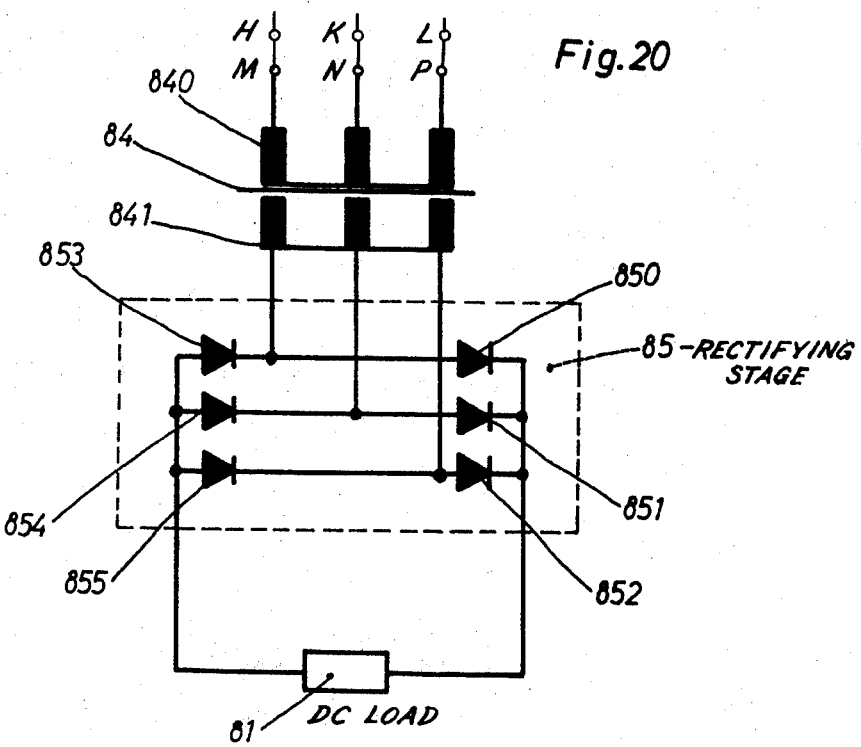

APPARATUS FOR THE SMOOTH SWITCHING-ON OF AN ELECTRICAL LOAD

If an asynchronous motor with a short-circuited rotor is suddenly started up by abruptly supplying it with the full working current, the high magnetic forces generated cause the motor to "start with a jolt" and the suddenly produced torque is transmitted to the machine driven by the motor and may damage it.

In the case of resistors which have a low ohmic resistance in the cold condition and rapidly increase their ohmic resistance on being heated up, as is the case with incandescent lamps, a high current surge results on switching on so that the line or main supply is subjected to a high load for a short period of time.

The purpose of apparatus for the smooth switching-on of an electrical load is to reduce the mechanical jolt or the current surge as well to an acceptable magnitude.

In order to reduce such switching-on surges or jolts proposals have been made to use motors with rotors or stator windings specially designed for this purpose. However, such motors cannot avoid surges or jolts completely and furthermore are relatively expensive. Therefore so-called star-delta circuits or starting transformers are used in practice. When such a star-delta circuit is used instead of a single large switching-on surge two smaller switching surges are produced and when starting transformers are used a separate setting device for the transformer is necessary in order that the operating voltage can be gradually increased. Although with a starting transformer it is possible to ensure that smooth switching operation can be achieved, it is necessary to move the transformer back into the starting position mechanically each time the starting operation is repeated. Furthermore such a transformer is extremely expensive.

In order to avoid the disadvantages of the above-mentioned apparatus so-called Kusa apparatus has been developed for providing a smooth start of short circuited rotor motors.

The principle of this circuit is that at the instant of switching-on at least in one phase of the electric load, for example a multi-phase asynchronous motor, an ohmic or inductive pre-resistor is arranged which limits the starting current in this phase. In accordance with the limitation of the current the magnetic starting torque in the motor, and thus also the mechanical starting jerks, are reduced. The resistor is either gradually bridged over or, in the simplest case bridged over in one step so that the full magnetic force is developed in the motor. Kusa apparatus of this type can, however, only be used for electrical loads whose mechanical or electrical back-torque is constant, since it is only possible to make one adaption of the preresistor and the time elapsing until the preresistor is bridged over. It has been found in practice that it is only in a very small number of motors that the starting torque or moment remains constant. The back-torque is thus found to change owing to various external factors, as for example variations in temperature, the material to be worked, the state of lubrication of the machine etc.

In order to avoid these disadvantages the use of electronic control devices has been proposed (BBC, Applikationen für vergossene Halbleiter-Kleingeräte CO1, TO1, VO1 sections 5.2.1, 5.2.5 and 6.8.3). Using a diode bridge circuit followed by a Zener diode a trapezoidal synchronization voltage is produced which is present at the base of a unijunction transistor. A manually-operated potentiometer is used to adjust the charging time constants and to control the charging by the trapezoidal voltage of a pulse capacitor, which on reaching a break-down voltage commutates the unijunction transistor into the conducting state. The capacitor is now abruptly discharged so that the unijunction transistor produces a transient pulse which is supplied via an ignition transfer means to a prethyristor. The latter is accordingly caused to be conducting and remains in this condition until the current of the prethyristor passes through zero. Since the potentiometer continuously reduces the value of the resistor, and accordingly the charging time of the pulse capacitor is correspondingly shortened, there is an advance in relation to the synchronization voltage halfwaves applied to the prethyristor, so that the pulses produced here become larger and larger and achieve a constant maximum length. Since for the control of the electric load two thyristors in inverse-parallel configuration are provided, it is necessary to produce a switching pulse for the one or the other thyristor alternately. This is carried out by a phase-dependent switch.

Thus although it is possible to provide for adaptation to the desired operational conditions, the control of the motor torque and the run-up time is not automatic and must be set by hand by adjustment of the potentiometer. Furthermore for renewed smooth switching-on of the motor it is necessary to return the potentiometer by hand back into its starting position.

In accordance with a further prior proposal the starting or run-up voltage was to be controlled by a preset potentiometer and a capacitor which was only discharged by means of a relay contact when the device was switched off. The run-up voltage and the synchronization voltage formed simultaneously were connected and amplified and on reaching a certain limiting or threshold value change a prethyristor or a thyristor tetrode over into the conducting condition and the thyristor controls the load switch for the electric load. Since a second capacitor is charged from the connecting point between the run-up and the synchronization voltage, this capacitor determines the instant in which the prethyristor becomes conducting or nonconducting. In the circuit for forming the synchronization voltage a transistor is provided which becomes conducting when the synchronizing voltage passes through zero and discharges the second capacitor.

Although in this case as well an adaptation to the desired operational conditions is possible, since the run-up speed can be changed by changing the basic setting of the potentiometer, the setting of the desired motor torque at the instant of switching-on is not provided for. Furthermore a large number of switching elements is necessary, so that this form of apparatus is extremely involved.

In accordance with a still further prior proposal a capacitor was to be charged under the control of two adjustable potentiometers in order to produce the run-up voltage. The voltage produced in this run-up stage is impressed in a bridge circuit on the voltage of the synchronization stage. The input of a transistor is connected with this point of connection between the voltage produced and the voltage of the synchronization stage. The transistor is normally conducting and on reaching the triggering value becomes nonconducting so that a capacitor is charged and a further transistor provides a transformer for the load switch with voltage. When the capacitor is charged, this further transistor becomes nonconducting and the current supply to the transformer is interrupted, while the load switch remains in the conducting condition until the working current itself passes through zero. By making the further transistor nonconducting the blocking voltage applied to the base of the first transistor is reduced via a feed back coupling so that the transistor becomes conducting again and the capacitor becomes discharged. If the voltage at the base of this transistor again exceeds the triggering threshold, the transistor becomes nonconducting again. In this manner switching pulses for the load switch are continuously produced in accordance with the run-up voltage and the synchronization voltage.

Although in the case of this apparatus both the maximum motor torque at the time of switching-on and also the run-up time can be set in advance, the apparatus is extremely involved.

One aim of the present invention is therefore to provide an apparatus for the smooth switching-on of an electric load in which the motor torque at the instant of switching-on and the run-up time can be preselected as may be desired and which is substantially simpler and less involved than known apparatus of this type.

The present invention consists in an apparatus for the smooth switching-on of an electrical load in which a supply line or main transformer is arranged to feed a rectifier and the latter has its output connected with, on the one hand, a synchronization stage, and, on the other, with a run-up stage, which are connected together at a connection point for forming a control voltage, and in which the input of a limiting value switch is connected with the connection point, this switch being connected via a smoothing capacitor with the run-up stage for forming a DC voltage, while a load switch, whose input is connected with the limiting value switch, is provided for controlling the voltage of the electric load, the apparatus further comprising, for each stage, a rectifier, and one transformer winding for each such rectifier, the input of the rectifier of each stage being separated galvanically from the rectifier of the other stage, a capacitor and at least one selector, the two capacitors being connected in series.

With this type of connection the voltage of the synchronizing and the run-up stages are added so that the point in time of reaching a predetermined triggering threshold can be selected in a particularly simple manner.

The pulses produced in this manner control a load switch for the electrical load, which when the working current passes through zero passes back into the nonconducting condition. The synchronization voltage and the load voltage must be synchronized, that is to say in step with each other, so that the load switch is not brought back into the conducting condition by the following synchronizing voltage rise. This synchronization necessarily occurs in an AC line or main supply of when the apparatus in accordance with the invention is connected between one phase and the neutral conductor of a polyphase system. However, often no neutral conductor is available. In this case a substantial degree of adaptation can be obtained while adopting the feature that the load switch and the one connection of the supply line or main transformer is connected in any desired phase and a second connection of the supply line or main transformer is made in the leading phase. In the case of motors which are capable of being reversed, the load switch and the first connection of the supply line or main transformer are preferably arranged in the phase which has not been exchanged so that also the second connection of the supply line transformer does not have to be changed over in the case of a reversal of rotation of the motor.

If a device for smoothly switching-on an electric load is only provided in one phase, it may be that in certain circumstances relatively high currents occur in the other two phases, so that more particularly in the case of a high power takeoff there may be an extraordinarily high load on the supply line or main so that the load and the supply wiring are heated. In accordance with the invention to cover this case a load switch controlled by a synchronization voltage and a run-up voltage is provided for each phase so that there is a current limitation in each phase.

In order to ensure that the apparatus in accordance with the invention is not subjected to voltage when the electrical load is switched off, all connections are preferably arranged on the load side of the main contactor, that is to say between the main contactor and the load. For reversing operation it is convenient to provide for this purpose for each load switch a further auxiliary contact, which is actuated in accordance with the two changeover contactors and serves to avoid the phase for the second connection of the main transformer being changed over. In order to ensure that the control voltage and load voltage are matched in time, in accordance with the type of electrical load, a phase shifting device is provided for the supply line or main transformer. In order to increase the switching reliability it is possible to provide a Zener diode between the negative connection point of the rectifier and the synchronizing stage.

The discharge of the two capacitors connected in series can be carried out using any suitable switching elements. However, it is particularly advantageous if a discharge diode is connected in parallel to the setting part between the capacitor and the current supply device and in parallel to the rectifier a discharge resistor with a low ohmic resistance is provided.

If the apparatus in accordance with the invention is to be used not only for smooth switching-on but also for gradual switching-off of a load, as is for example desired in the case of stage or special effect lighting, it is possible in accordance with a further feature of the invention to provide in the run-up stage a discharge resistor for the capacitor, the discharge resistor possibly being associated with the discharge diode if such a diode is provided, and a switch is located between the smoothing capacitor on the one hand and the setting part and the discharge resistor on the other hand. In order to separate the operating elements of the smooth switching-on apparatus galvanically from the main or supply line voltage, it is possible in accordance with the invention to provide between the limiting value switching stage and the load switch a matching stage which is provided with a transformer which galvanically separates the matching stage from the load switch.

In accordance with a preferred embodiment of the invention a triac is provided as a load switch, so as to result in a particularly simple circuit for the load switch. If the apparatus in accordance with the invention is to be used for the smooth switching-on of a DC-machine, for example a DC-motor, the electrical load is connected in accordance with a further feature of the invention via at least one transformer and a rectifying stage with the load switch.

With the present invention it is possible to achieve an individual setting for each switching-on operation, and possibly also of a switching-off operation so that it is possible to achieve a precise matching to suit the operational conditions existing in each individual case, since both the starting torque, corresponding to the basic brightness in the case of incandescent lamps, and also the run-up time (switching-on time) can be set precisely and individually. Furthermore far fewer switching elements are required so that the apparatus in accordance with the invention becomes very simple and is extremely economical. Furthermore the present invention can be used with DC-machines.

In what follows the invention is described with reference to the accompanying drawings in more detail.

FIGS. 11 and 12 are circuit diagrams showing various embodiments of a current supply device forming part of the apparatus in accordance with the invention.

FIG. 13 is a circuit diagram of another embodiment of the synchronization stage of the apparatus in accordance with the invention.

FIG. 14 is a circuit diagram of a starting or run-up stage, forming part of the apparatus in accordance with the invention, suitable for the switching-on and switching-off.

FIG. 19 is a circuit diagram illustrating the connection of the electric load via a transformer and a rectifying stage with apparatus in accordance with the invention.

FIG. 20 is a circuit diagram of another form of connection of the electric load with apparatus in accordance with the invention.

Figure 1:
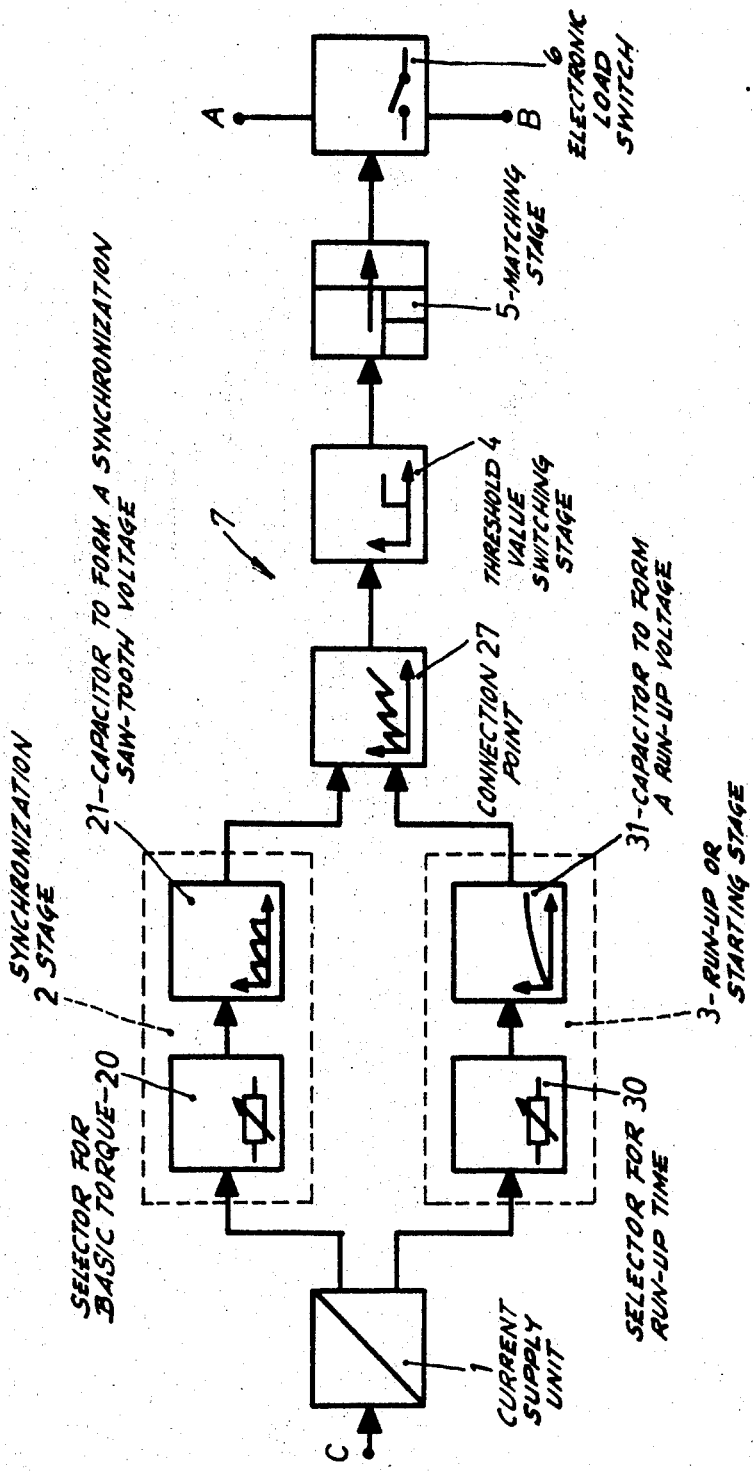
FIG. 1 is a diagram representing the principle of an apparatus in accordance with the invention for the smooth switching-on of an electrical load.

FIG. 1 is a general plan showing the connection and relationship of the principal components of the apparatus in accordance with the invention for the smooth switching-on of an electrical load. A synchronization stage 2 is supplied with current from a circuit supply device or unit 1. The synchronizing stage comprises a selector 20 for setting the basic torque desired and a capacitor 21 to form a synchronization saw tooth voltage. Simultaneously the current supply unit 1 supplies a run-up or starting stage 3, which with the help of a selector 30 for the run-up time and a capacitor 31 forms a run-up voltage. The synchronization voltage and the run-up voltage are impressed upon one another additively in accordance with the invention at the connection point 27 and the resulting value is fed to a threshold value switching stage 4. On reaching a voltage of a certain magnitude the threshold value switching stage 4 becomes conducting so that an electronic load switch 6, generally via a matching stage 5, receives an ignition current. Accordingly it becomes conducting and remains in this condition until the load current passes through zero.

The matching stage 5 is not absolutely essential, as will appear from the ensuing description below.

Figure 2:
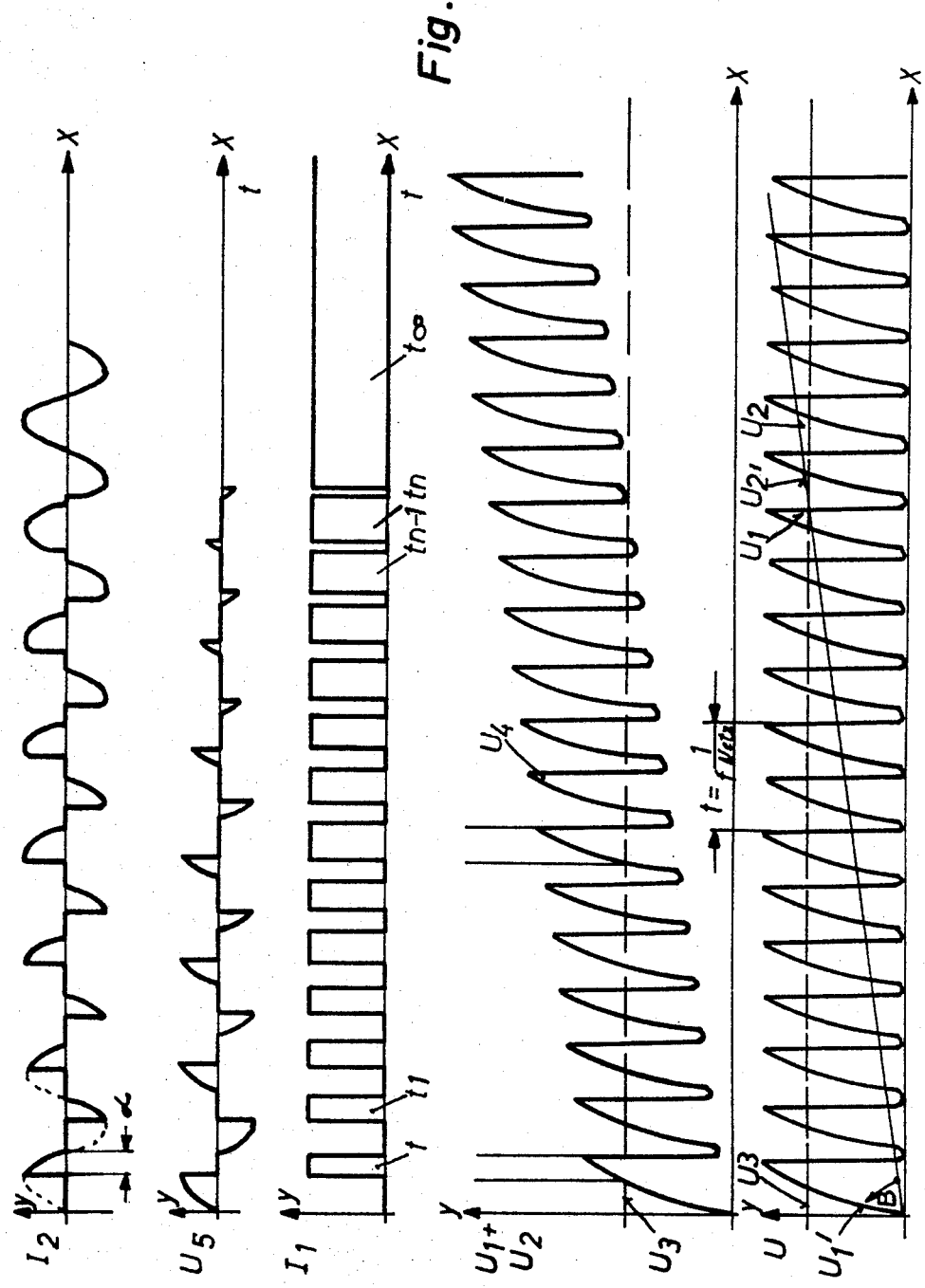
FIG. 2 is a graphic representation of the voltage relationships at the two capacitors and at the connecting point between the synchronization and run-up stages, together with the corresponding voltage and current relationships at the load switch.

The relationships of the voltage and current factors are important for an understanding of the present invention. In FIG. 2 the run-up time is represented on the x or horizontal axis as abscissae and the various voltages and current values are shown in different graphs on the y or vertical axis as ordinates. In the synchronization stage 2 a saw tooth shaped synchronization voltage $U_1$ is produced, the peaks lying above or below the switching threshold of the threshold value switching stage 4 in accordance with the type of load and the setting of the selector 20. The time during which the switching threshold (determined by the threshold value voltage $U_3$) of the threshold value switching stage 4 is exceeded by the synchronizing voltage $U_1$ determines the ignition time $t, t_1 \ldots t_{n-1}, t_n, t_{inf}$, during which an ignition current $I_1$ flows for actuating the load switch 6. This time is therefore dependent on the slope $\beta$ of the voltage rise flank $U_1'$ of the synchronization voltage $U_1$, this slope $\beta$ being determined by the size of the resistance value set by the selector 20, since the capacity of the capacitor 21 cannot be changed. If this resistance value is low, the voltage rise flank $U_1'$ is steep. In the case of a larger resistance value the voltage rise flank $U_1'$ is correspondingly less steep and vice versa. Naturally the resistance value can be arranged to be non-adjustable when the capacitor 21 is adjustable and thus simultaneously form the setting part 20. When the load switch 6 has a firing or igniting current $I_1$ impressed on it, it becomes conducting and allows the load current $I_2$ to flow for the duration of the conduction angle $\alpha$. The load switch 6, which has become conducting owing to the igniting current $I_1$ (so that the load voltage $U_5$ collapses) remains open until the load current $I_2$ passes through zero.

While the synchronization stage 2 forms a synchronization voltage $U_1$ with a frequency twice that of the line or supply voltage (as will be explained in more detail below) the run-up voltage $U_2$ gradually increases in accordance with the resistance value set with the help of the selector 30. Both voltages, the saw tooth shaped synchronization voltage $U_1$ and the run-up voltage $U_2$, are added at the connection point 27 to form a control voltage $U_4$. The threshold voltage 43 is thus exceeded somewhat earlier in each following supply halfwave. This depends upon the voltage rise flanks $U_1'$ of the synchronization voltage $U_1$ and $U_2'$ of the run-up voltage $U_2$. The firing or ignition time t therefore becomes longer and longer.

When after the completion of the setting procedure the value of the run-up voltage $U_2$ is greater than that of the threshold voltage $U_3$, the run-up voltage $U_2$ is in itself sufficient to maintain the threshold value switching stage 4 constantly in its conducting stage. The ignition time thus becomes infinitely large $(t_{inf})$ and the ignition current $I_1$ changes over into DC. Correspondingly the load voltage $U_5$ collapses somewhat earlier during the switching-on procedure until the voltage disappears completely and the conduction angle $\alpha$ of the load current $I_2$ becomes larger and larger until it reaches 180° and the load current $I_2$ changes over into a sinusoidal curve. The time from start to finish of the switching-on procedure is thus substantially determined by the voltage rise flank $U_2'$ of the run-up voltage $U_2$.

The use of DC for controlling the load switch 6 offers the great advantage that the load switch fires again reliably immediately after the load current $I_2$ has passed through zero. Furthermore the smooth switching-on device in accordance with the invention can be made extremely simple in this case.

If the operating part of the smooth switching-on device is to be completely separated galvanically from the mains or line supply, an ignition transfer device in the form of a transformer is required. This can, however, only transmit pulses and no DC. For this purpose the igniting current $I_1$ is chopped.

Figure 3:
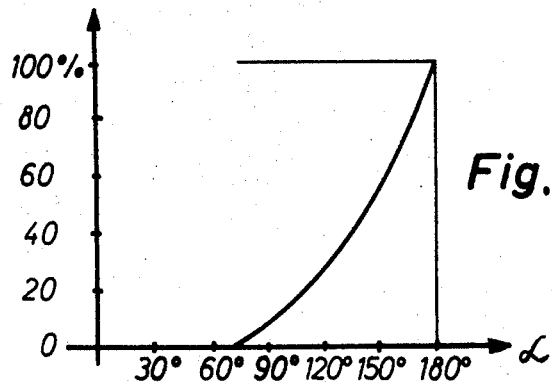
FIG. 3 is a graph showing the relationship between the torque and conduction angle.

An electric motor begins to rotate only after a certain torque is achieved. Although in principle the ignition time t can be selected so as to be extremely short, there is on the other hand no point in choosing such a short time that the conduction angle $\alpha$ for the load current $I_2$ is too small and the motor cannot yet start. The dependency of the torque on the conduction angle is shown in FIG. 3 with reference to an example. The values naturally vary from case to case in accordance with the type of motor and the type of load to be driven by this motor.

Figure 4:
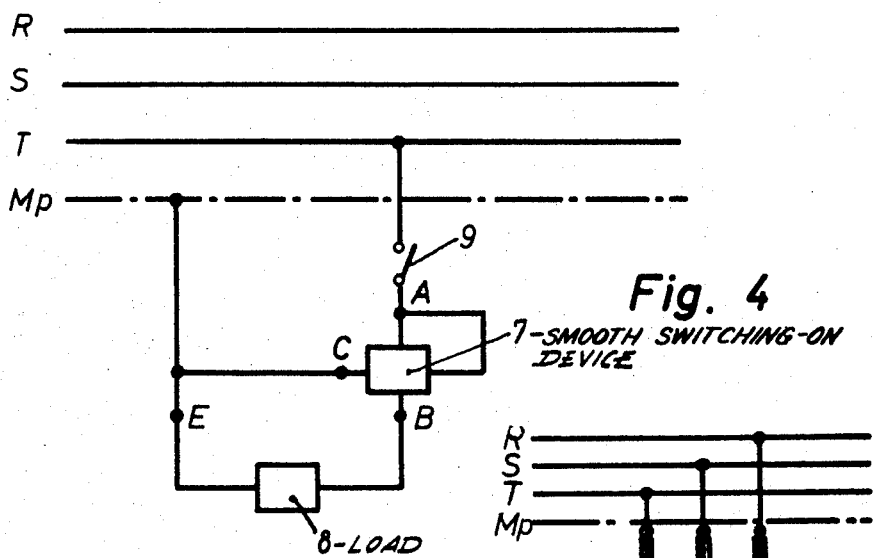
FIG. 4 is a circuit diagram showing the connection of apparatus in accordance with the invention to an AC main or supply line.

In order that the load switch 6 is switched off at the correct time having regard to the synchronization voltage $U_1$ and is not brought into the conducting condition too early, the synchronization voltage $U_1$ and the load voltage $U_5$ must be matched to suit each other. This mutual matching comes as a matter of course when the smooth switching-on device 7 is connected between one of the phases R, S or T and the neutral conductor Mp (FIG. 4). The load switch 6 shown in FIG. 1 is in this case arranged so that its two load terminals A and B are connected with the phases R, S and T respectively, the current supply unit 1 also being supplied from the load terminal A. The second connection of the current supply unit 1 is via the connection terminal C, which is connected with the neutral conductor Mp.

If now the electric load 8, for example a motor or a number of electric incandescent lamps or the like is to be switched on smoothly, the switch 9 is closed. The preset selector 20 determines the conduction angle $\alpha$ at the beginning of the switching-on operation and in accordance with the setting of the selector 30 the load 8 is switched on completely after a certain time has elapsed.

The smooth switching-on device 7 operates in the same manner when the load 8 is connected between two phases so that the smooth switching-on divide 7 is parallel to the load 8.

In the case of a mixed ohmic-inductive load there is, however, in this case a certain phase displacement so that even at the start of the switching-on operation a certain conduction angle $\alpha$, for example of 60°, is present.

Figure 5:
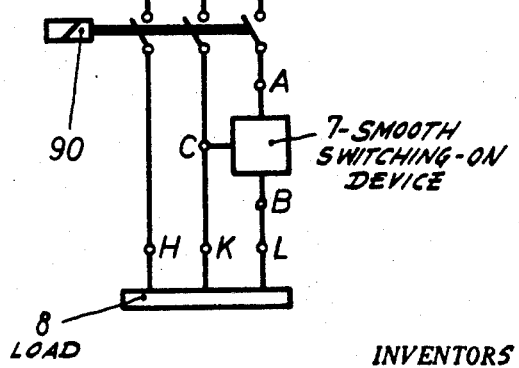
FIG. 5 is a circuit illustrating an arrangement a possibility for connecting apparatus in accordance with the invention to interlinked phases of a polyphase main or supply line.

In the case of a load 8 connected with three phases, as shown in FIG. 5, the load connection terminals A and B of the smooth switching-on device 7 can be connected with any phase, while for proper mutual matching of the synchronizing voltage $U_1$ and the load voltage $U_5$ the connection terminal C is connected with the leading phase. The same applies for a load 8 connected with two phases, for compensation of the above-mentioned phase displacement the connection terminal C being connected with the phase which leads with respect to the phase with which the load connection terminal A is connected. In the case of FIG. 4 it is therefore necessary, if the load 8 is to be connected with the two phases, for the connection terminal C to be connected with the phase R, since the load connection terminal A is connected in the phase T.

Figure 6:
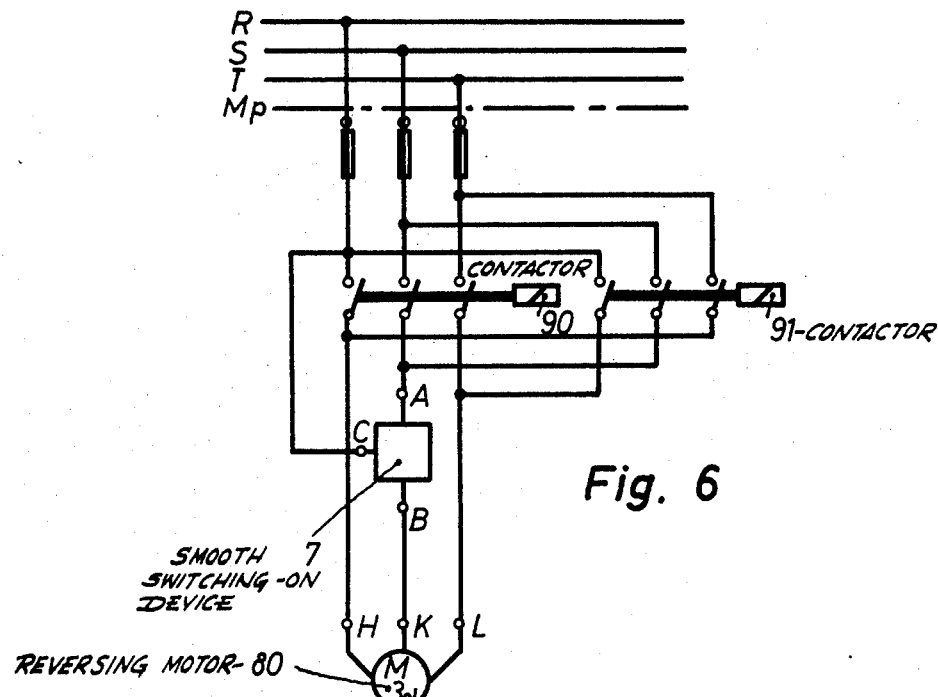
FIG. 6 is a circuit diagram showing the connection of apparatus in accordance with the invention for a reversible motor.

In the case of a load in the form of a reversing motor 80, the smooth switching-on device 7 is connected as shown in FIG. 6. Conventional contactors 90 and 91 change over the phases for reversing. Since the center or neutral phase S is not changed over, the smooth switching-on device 7 is connected in this phase. When the contacts of the contactor 90 are closed, the phase shown on the left continues to be the leading phase R. If, however, the contacts of the contactor 91 are closed, the phase shown on the left of the smooth switching-on device 7 is the lagging phase T. For this reason the connecting terminal C is connected on the supply side of the contactors 90 and 91 with the phase R.

Figure 8:
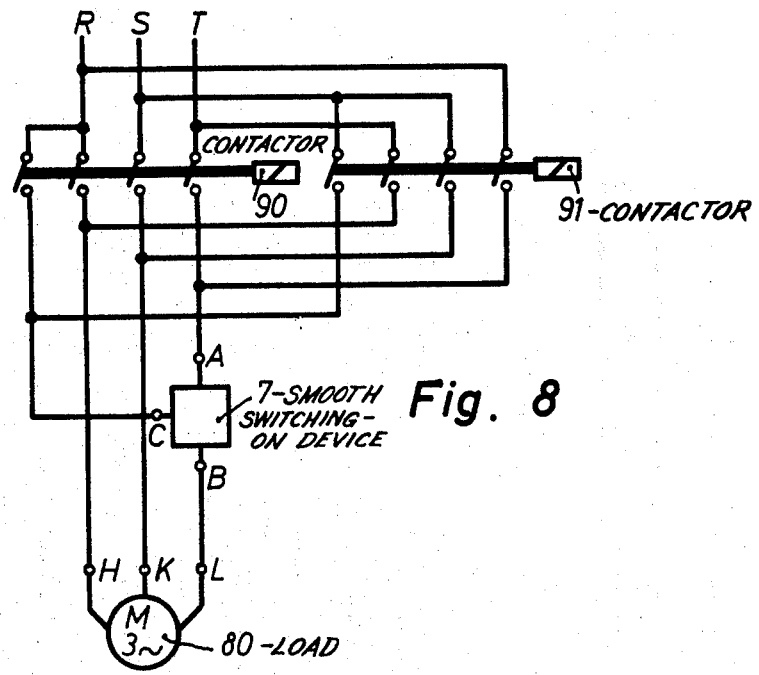
FIG. 8 is a circuit diagram showing the connection of apparatus in accordance with the invention to interlinked phases of a reversible motor.

In principle it is possible to connect the connections A and B of the load switch 6 with any phase as may be desired. However, since on changing over the phases R and T the phase S in the one case and the phase T in the other case is the leading phase with respect to the phase R, in this case two contact-controlled connections A and C of the smooth switching-on device 7 are necessary. If the smooth switching-on device 7 is to be completely separated from the main or line supply in the nonoperational condition such contacts are in any case necessary for reversible motors 80 so that connection can be made as shown in FIG. 8.

Naturally the connecting terminal C of the smooth switching-on device 7 as shown in FIGS. 4 and 6 may also be separated by one or more contacts from the supply. On connection of the load switch 6 of the smooth switching-on device 7 in the second phase S the connecting terminal C is connected via a contact a contact of the contactor 90 and of the contactor 91 with the phase R, similarly to the arrangement already shown in FIG. 8.

If a smooth switching-on device 7 is only provided in one single phase for switching on an electric load 8, relatively high switching-on currents may occur in the two other phases in accordance with the type of load. These high currents lead to a very high loading of the supply, more particularly in the case of loads with a high power demand, and the load 8 and the lines are heated. It is therefore convenient to limit the switching-on or starting current in each phase. For this purpose, in accordance with FIG. 7, in each phase R, S and T a respective smooth switching-on device 7, 7' and 7" is provided, whose connecting terminals C, C' and C" are connected with that phase which leads with respect to the phase with the associated load connection terminals A and B, A' and B' and A" and B". The load is in this manner even more smoothly switched on than is the case with only one single smooth switching-on unit and device 7. Besides large motors this arrangement is, for example, very advantageous in the case of large factory premises with incandescent lighting, since during switching-on such lighting draws up approximately 10 times as much current as in normal operation.

Figure 9:
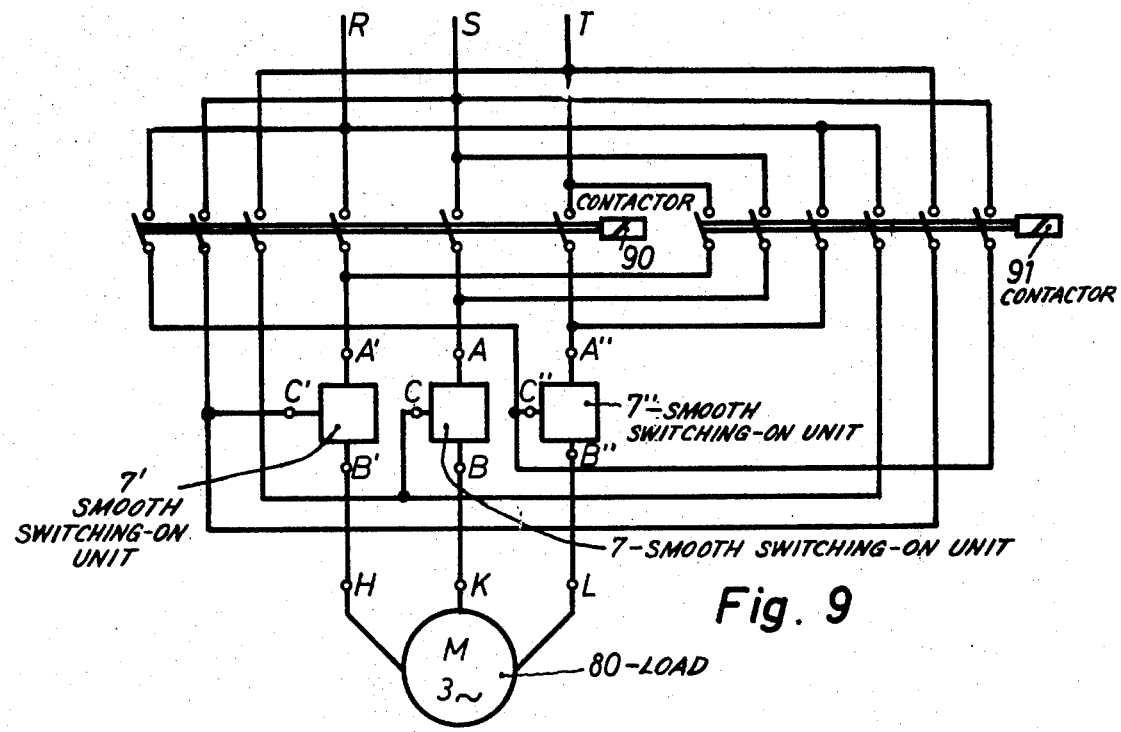
FIG. 9 is a circuit diagram illustrating the connection of respective apparatuses in accordance with the invention with respective phases of a polyphase supply for a reversible motor.

Also in the case of reversing motors 80 it is possible to provide in each phase R, S and T a respective smooth switching-on unit 7, 7' and 7". For this purpose, as shown in FIG. 9, for each smooth switching-on unit 7, 7' and 7" a further respective auxiliary contact, actuated by the contactor 90 or 91, is provided, which ensures that the phase position of the connection terminals C, C' and C" also changes with respect to the load connection terminals A and B, A' and B' and A" and B".

As already mentioned the connection terminal C must be arranged in the leading phase. The correct connection can be readily determined by trial, since in the case of an incorrect phase connection the smooth switching-on device 7 becomes ineffective owing to the phase displacement which occurs.

Figure 10:
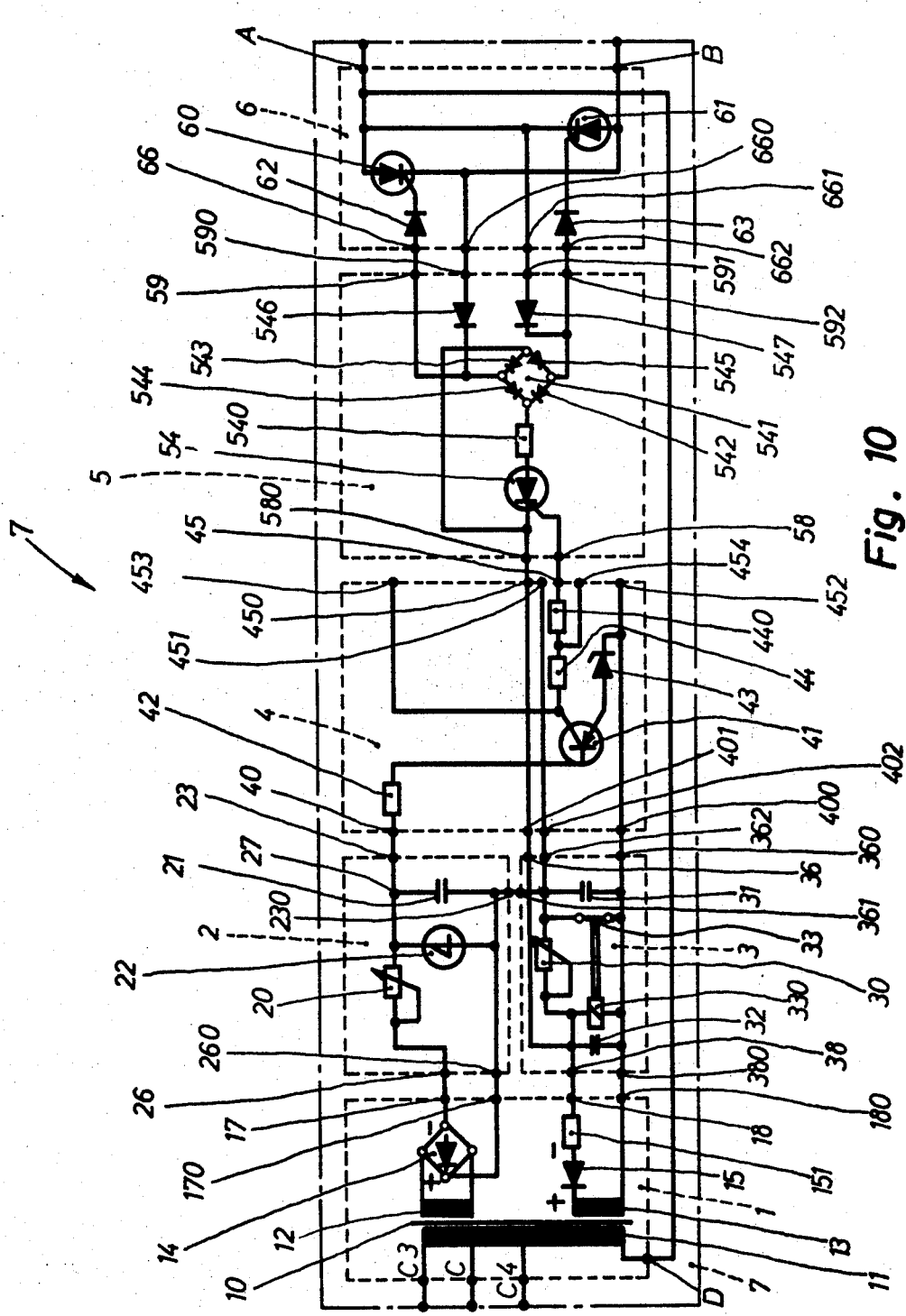
FIG. 10 is a circuit diagram of an embodiment of the apparatus in accordance with the invention.

An embodiment of the smooth switching-on device 7 in accordance with the invention is shown in FIG. 10. The current supply unit or device 1 comprises a transformer 10 with a primary winding 11 and two secondary windings 12 and 13. The primary winding 11 has a connection terminal D, which is connected with the load connection terminal A of the smooth switching-on device. The other connection terminal C is connected with the power supply phase which leads with respect to the phase connected with the load connection terminal A. In order to ensure that the smooth switching-on device can be connected to different supply voltages it is convenient if the primary winding 11 besides the connection terminal C has further connection terminals $C_3$ and $C_4$. For example the connection terminal C is for use with 380 V, the connection terminal $C_3$ for connection with 500 V and the connection terminal $C_4$ for connection with 220 V.

For the synchronization stage 2 and for the starting or run-up stage 3 respective rectifiers 14 and 15 are provided, whose input sides are galvanically completely separated from the rectifier of the other stage. In this manner each of the two stages 2 and 3 can function independently of the other stage. For the synchronization voltage half-waves of twice the power supply frequency are necessary so that for each load voltage halfwave from the synchronizing stage 2 a new pulse is provided for control of the load switch 6. Thus for the synchronization stage 2 a rectifier bridge 14 is necessary, which is fed via the secondary winding 12 of the supply transformer 10. On the other hand for the starting or run-up stage 3 it is of no significant importance whether it is supplied with halfwaves of single or double frequency, since these differences can be cancelled out by the dimensioning of a smoothing capacitor 32 (in the starting stage 3) and a resistor 151. In accordance with FIG. 10 this rectifier 15 therefore consists of a simple diode, which is connected with the above-mentioned resistor 151. However, instead of the diode it is also possible to use a rectifier bridge 150 (see FIG. 11) so that both the positive and also the negative halfwaves of the supply voltage are utilized. The resistor 151 is not necessary in the case of this construction. Current is supplied to the rectifier 15 or the rectifier bridge 150, respectively, from the secondary winding 13 of the supply transformer 10.

The current supply device 1 is connected on the negative connection side of the rectifier bridge 14 via a junction 17 with the junction 26 of the synchronization stage 2, on the positive connecting side of the rectifier bridge 14 via a junction point 170 with the junction point 260 of the synchronization stage 2, on the negative connection side of the rectifier 15 or the rectifier bridge 150 via a junction point 18 with the junction point 38 of the starting or run-up stage 3, and on the positive connection side of the rectifier 15 or of the rectifier bridge 150 via a junction point 180 with the junction point 380 of the starting or run-up stage 3.

The synchronization stage 2 comprises a selector 20 constructed as a potentiometer, with whose help the resistance value, which determines the charging time of the capacitor 21, can be set as desired. By increasing the resistance value of the selector 20 the charging time of the capacitor 21 is increased so that the voltage rise flank $U_1'$ of the synchronization voltage $U_1$ (FIG. 2) becomes less steep, and vice versa. In order for the capacitor 21 to be discharged at the end of each halfwave, a so-called "unilateral switch" or a four layer diode 22 is connected in parallel to the capacitor, as shown in FIG. 10.

The starting or run-up stage 3 comprises in addition to the capacitor 31 for producing the starting or run-up voltage $U_2$, the smoothing capacitor 32, which smooths the pulsating DC produced by the rectifier 15 (FIG. 10) or the rectifier bridge 150 (FIG. 11). Furthermore for the capacitor 31 a selector 30 constructed as a potentiometer is provided, which determines the charging time of the capacitor 31 and thus also the run-up or starting time. In parallel with the capacitor 31 a contact 33 is provided, which is opened by a relay 330 arranged parallel to the smoothing capacitor 32 for the time in which the smooth switching-on device 7, and thus also the load 8 or 80, is switched on. In order to ensure that the contact 33 does not become welded on closing, the current is preferably, as is conventional, limited by a current limiting resistor, not shown. The contact 33 can, however be controlled by the switch 9 or (FIG. 4) the contactor 90 (FIG. 5 or 6), for reversing operation of a contact (not shown) controlled by the contactor 91 (FIG. 6) is provided which is parallel to the contact 33.

The two capacitors 31 and 21 are connected in series via the junction points 230 and 361 so that the voltages stored in the capacitors 31, 32, present at the junction point 27 of the synchronization stage 2 with the starting or run-up stage 3 are added together.

The limiting or threshold value switching stage 4, which is connected by the connection or junction point 40 with the junction point 23 of the synchronization stage 2 and by the junction point 400 with the junction point 360 of the starting stage 3, comprises a transistor 41, whose base is supplied via a decoupling resistor 42 with voltage. The determination of the firing threshold of the transistor 41, and thus of the whole limiting or threshold value switch stage 4, is performed by a Zener diode 43. In a conventional manner working resistors 44 and 440 are associated with the transistor 41 for limiting the current flowing through it.

For a load switch 6 use is made of two thyristors 60 and 61 in inverse parallel configuration, in whose gate leads diodes 62 and 63 are connected respectively.

Between the threshold value switch stage 4 and the load switch 6 a matching stage 5 is connected, which in accordance with the phase position supplies alternately firing current $I_1$ to the thyristor 60 and to the thyristor 61 respectively. The matching stage 5 comprises a prethyristor 54, which for limiting the working current is connected with a working resistance 540 and a rectifying bridge 541 arranged in its working current circuit, such bridge including the four diodes 542, 543, 544, and 545. For supplying the thyristors 60 and 61 two diodes 546 and 547 are provided, of which each supplies a gate of one of the thyristors 60 and 61 with the supply or mains current, in accordance with the phase position.

The matching stage 5 is connected with the threshold value switching stage 4 via the junction points 58 and 45 and with the starting or run-up stage 3 via the junction points 580, 450, 401 and 36. The connection with the load switch 6 is via the junction points 59 and 66, 590 and 660, 591 and 661, and 592 and 662.

The smooth switching-on device 7, whose arrangement has been described above functions in the following manner.

On switching on the electric load 8 or 80 the smooth switching-on devices 7, 7' and 7'', which can be connected in accordance with FIGS. 4 and 9, are switched on simultaneously by the switch 9 or the contactor 90 or 91, in accordance with the respective direction of rotation. The load switch 6 is thus connected with the load voltage $U_5$ but, however, is not in the conducting state, since at the base of the prethyristor 54 no control voltage $U_4$ is applied. Simultaneously the transformer 10 is supplied with the load voltage $U_4$, the voltage $U_5$ is converted to a suitable voltage and galvanically separated rectified for the synchronization stage 2 and the starting stage 3 with the help of the rectifying bridge 14 and the rectifier 15 or the rectifier bridge 150 respectively.

Since the charging time depends upon the product of the capacity of the capacitor and the resistance connected with it, and the capacity of the capacitors 21 and 31 remains constant, this charging time can be varied by varying the resistance value of the selectors 20 and 30. It is also possible for the resistance value to remain constant and the capacity to be changed so that the capacitors 21 and 31 simultaneously form the selectors 20 and 30, respectively, which in this case are each connected with a nonadjustable resistor. Since the capacitor 21 must be charged up within a halfwave, it has a small capacity in comparison with the capacitor 31. Also the resistance value of the selector 20 is small in relation to the selector 30.

The capacitor 21 will abruptly discharge when the charged voltage exceeds the breakdown level of the four layer diode or of the unilateral switch 22.

Owing to the gradual charging and the rapid discharging of the capacitor 21 a synchronization voltage $U_1$ is produced in the synchronization stage 2 and this voltage $U_1$ passes via the decoupling resistor 42 to the transistor 41, which on achieving the threshold voltage $U_3$, as set by the Zener diode 43, becomes conducting. Accordingly a firing current $I_1$ flows to the base of the prethyristor 54, which now also becomes conducting. Thus also in the matching stage 5 and in the load switch 6 in one voltage halfwave a substantially sinusoidal firing current flows from the load connection terminal B via the diode 546, the diode 544 of the rectifying bridge 541, the working resistor 540, which limits the firing current, the prethyristor 54, the diode 545 of the rectifying bridge 541, the diode 63 and the thyristor 61 to the load connection terminal A. Owing to the firing of the thyristor 61 the load current $I_2$ now flows from the load connecting terminal B to the load connecting terminal A and thus to the load 8 or 80 respectively. In the following halfwave the firing current $I_1$ flows from the load connection terminal A via the diode 547, the diode 542 of the rectifying bridge 541, the working resistor 540, the prethyristor 54, the diode 543 of the rectifying bridge 541, the diode 62 and the thyristor 60 to the load-connection terminal B. The thyristor 60 is accordingly fired so that the load current $I_2$ flows via the load connection terminal A, the thyristor 60, the load connection terminal B to the load 8 or 80 respectively.

Also the run-up or starting voltage $U_2$ gradually increases owing to the increasing charge in the capacitor 31 so that at the junction point 27 (FIG. 1 or 10) between the synchronization stage 2 and the run-up stage 3 the synchronization voltage $U_1$ and the run-up or starting voltage $U_2$ are added together. The control voltage $U_4$ formed by this adding achieves the threshold voltage $U_3$ which is determined by the limiting Zener diode 43, earlier and earlier so that the transistor 41, and therefore the load switch 6, becomes conducting earlier and earlier. The conduction or current flow angle $\alpha$ (FIG. 2) thus becomes greater and greater until it reaches a value of 180°. Thus the switching-on operation is terminated.

Owing to the increase in size of the conduction angle $\alpha$ the load 8 or 80 respectively (FIGS. 4 to 9) receives current for longer periods correspondingly from one half-wave to the next so that accordingly also the power developed in the load becomes larger and larger until the full power is developed. In accordance with this increase in the power developed the starting moment or starting torque in a motor such as motor 80 increases so that the motor rotates with an ever increasing speed of rotation until the full speed is achieved by the motor.

The individual units such as the current supply unit 1, the synchronizing stage 2, the running-up or starting stage 3, the threshold value switch 4, the matching stage 5 and the load switch 6, by which the smooth switching-on unit or device 7 in accordance with the invention is made up, can be constructed in various different fashions the different embodiments of such a unit being exchangable one for the other.

In what follows various further embodiments are described.

If the smooth switching-on device 7 and the load 8 or 80 respectively are connected in parallel, that is to say if the smooth switching-on device is connected between a phase R, S or T and the neutral or center conductor Mp, the control voltage $U_4$ and the load current $I_2$ are necessarily synchronized. If the smooth switching-on device 7 is connected in a three-phase or polyphase supply system but between interlinked phases, there is a phase displacement of 60° at the load switch 6 between the load current $I_2$ and the control voltage $U_4$, this phase displacement representing a lead of the load current $I_2$ with respect to the control voltage $U_4$, so that the smooth switching-on of a purely ohmic load 8 is not possible. Since, however, a motor 80 constitutes a mixed ohmic-inductive load, its inductance brings about a delay in the load current $I_2$ of about 60° so that the phase displacement between the load current $I_2$ and the control voltage $U_4$ is cancelled out.

In the case of an ohmic load this phase displacement must, however, be cancelled out by a phase shifter. In accordance with the current supply of FIG. 11 this phase shifter comprises a capacitor 16, which is connected in parallel with the primary winding 11 of the transformer 10, and a resistor 160 connected both with the capacitor 16 and also with the primary winding 11 of the transformer in series.

If several connection terminals C, $C_3$ and $C_4$ are provided for connection with certain voltages (as shown in FIG. 10) is it possible, in a similar manner, to provide such a phase shifter respectively between the connection terminals C and D, between $C_3$ and D, and between $C_4$ and D.

It is, however, also possible to arrange the resistor 160 and the capacitor 16 of the phase shifter so as to be mutually parallel and together in series with the primary winding 11 of the transformer 10 (see FIG. 12).

Irrespectively of whether a phase shifter is necessary or not, an increase in the switching accuracy of the load switch 6 can be achieved by adopting the feature that the halfwaves of double frequency, produced by the rectifying bridge 14, are separated from each other. For this purpose between the negative connection side of the rectifying bridge 14 and the synchronizing stage 2 a Zener diode 19 is provided as shown in FIG. 12 which, when the voltage has still not yet achieved a certain value or has sunk below this value again, becomes non-conducting and only in the case of the presence of a voltage exceeding this value becomes conducting. Since in this manner intervals are produced between the halfwaves of the synchronization voltage $U_1$, in the case of any phase displacement present, which could also be caused during the switching-on operation in the mains or line supply, it is ensured that nevertheless the synchronization voltage $U_1$ and the load voltage $U_5$ pass through zero at the same time and the load voltage 6 is in fact brought into the noncon-ducting condition each time the load voltage $U_5$ passes through zero.

The synchronization stage 2 can also be constructed differently.

As shown in the synchronization stage 2 of FIG. 13, for stabilizing the load voltage for the capacitor 21 a Zener diode 24 is provided between the junction point 26 and the junction point 260, which is connected with a resistor 240. The resistor 240 is connected in series with this Zener diode 24 and a selector 20. This Zener diode 24, which on achieving a certain voltage becomes conducting, limits therefore the charging voltage for the capacitor 21 and therefore stabilizes this voltage. This stabilization of the loading voltage for the capacitor 21 by a Zener diode 24 and a resistor 240 is also possible in the case of the construction in accordance with FIG. 10.

The selector 20 comprises a potentiometer in the case of the construction of FIG. 10. To cover the case, however, that the smooth switching-on device 7 is to be used for different frequencies, for example 50 cps and 60 cps selectively, the selector 20 is advantageously made up of two adjustable resistors (FIG. 13). For bringing about matching to suit the desired starting torque at the time of switching-on of the electric load use is made of the previously mentioned potentiometer 200, while for adaptation of matching to the desired supply frequency the variable resistor 201 is set. Since the charging time of the capacitor 21 depends essentially upon the selector 20, and the capacitor 21 has to be more rapidly charged at 60 cps than at 50 cps, at 60 cps the resistor 201 is set at zero or at least at a value lower than for 50 cps. It is naturally also possible to provide this individual matching to suit the supply frequency, and setting of the desired initial starting torque, in the case of the construction shown in FIG. 10.

The synchronization stage of FIG. 13 shows also a simple circuit for discharge of the capacitor 21 each time the supply voltage passes through zero. Instead of the four layer diode or the "unilateral switch" 22 a discharge diode 25 is provided which is connected in parallel with the selector 20 and, if provided, with the resistor 240. This discharge diode 25 conducts in a direction from the rectifying bridge 14 towards the capacitor 21. Furthermore between the junction points 26 and 260 a low ohmic value discharge resistor 250 is provided for the capacitor 21. While charging the capacitor 21 current flows from the rectifying bridge 14 (FIG. 10) via the connecting points 170 and 260 to the capacitor 21 which is accordingly charged. The return of the current is via the selector 20. The discharge of the capacitor 21 occurs via the resistor 250 and the diode 25 when the voltage decreases at the junction point 26 so that between the charged capacitor 21 and the junction point 26 a sufficient voltage drop exists.

This connection for discharge of the capacitor 21 of the synchronization stage 2 can also be used for discharge of the capacitor 31 of the starting or run-up stage 3 (FIG. 14). Since the voltage at the capacitor 31 is smoothed by the capacitor 32 and thus is supplied to the capacitor 31 during the whole of the time in which the electric load is switched on, the discharge of the capacitors 31 and 32 can only occur via the discharge resistor 340 and the discharge diode 34 when the electrical load 8 or 80, respectively, and thus also at least one connection phase of the smooth switching-on device 7, is disconnected from the current supply.

The smooth switching-on device 7 in accordance with the invention can be used not only for the smooth switching-on of a device, but also for the gradual switching-off of a device, as may be desired for example in stage lighting or other special effect lighting. For this purpose, in accordance with a further feature of the invention, between the smoothing capacitor 32 of the starting or run-up stage 3 on the one hand, and between the selector 30 and the discharge resistor 340 on the other, a switch 35 is provided.

If the load 8, for example a large number of incandescent lights, is switched on when the switch 35 is open, no starting or run-up voltage $U_2$ can be produced and the control voltage $U_4$ for the threshold value switch 5 is only formed by the synchronization voltage $U_1$. The incandescent lamps mentioned as an example therefore do not shine with their full brightness, and only exhibit a basic degree of brightness as determined by the selector 20 of the synchronization stage 2. In this case, therefore, the setting part does not determine a basic starting torque but a basic brightness. If the crests of the synchronization voltage $U_1$ lie below the threshold voltage $U_3$ owing to a corresponding setting of the selector 20, the incandescent lights do not even achieve a basic degree of brightness at the time of switching on.

If the switch 35 is closed, the brightness increases more and more since the starting or run-up voltage $U_2$ becomes larger and larger and, owing to the addition of the synchronization voltage $U_1$ and the starting or run-up voltage $U_2$, form an increasing control voltage $U_4$.

If the switch 35 is opened again, the capacitor 31 discharges slowly, since the discharge current can only flow via the selector 30 and the resistor 340. Since a synchronization voltage $U_1$ continues to be formed, the incandescent lamps are only dimmed until the basic degree of brightness as set by the selector 20 is reached.

If the incandescent lamps are switched out, however, when the switch 35 is closed with the help of the switch 9 (see FIG. 4), it is not only the capacitor 21, but also the capacitor 31, which can abruptly discharge when the switch 35 is closed, so that the incandescent lamps are immediately switched off.

A gradual switching off of an electric load 8 is also possible in the case of the construction as shown in FIG. 10. For this purpose it is only necessary to provide a suitable resistance in the line with the contact 33 and to provide a switch 35 between the connection point 38 and the selector 30.

During starting or running up the conduction angle $\alpha$ or current flow angle becomes larger and larger and accordingly there are longer and longer firing current pulses, the intervals between the pulses having to be precisely in agreement with the instant at which the load voltage $U_5$ passes through zero in order to avoid improper switching operations. If the firing current $I_1$ changes into DC at the end of starting, however, (FIG. 2), as is the case with the use of a matching stage 5 in accordance with FIG. 10, such a precise mutual matching is not necessary.

Since in this case the firing current $I_1$ is DC, and such a current cannot be transmitted by a transformer, it is, however, not possible to separate the operating part of the smooth switching-on device 7, that is to say the selectors 20 and 30, from the load voltage $U_5$. Therefore insulating means are to be used in a suitable manner.

Figure 15:
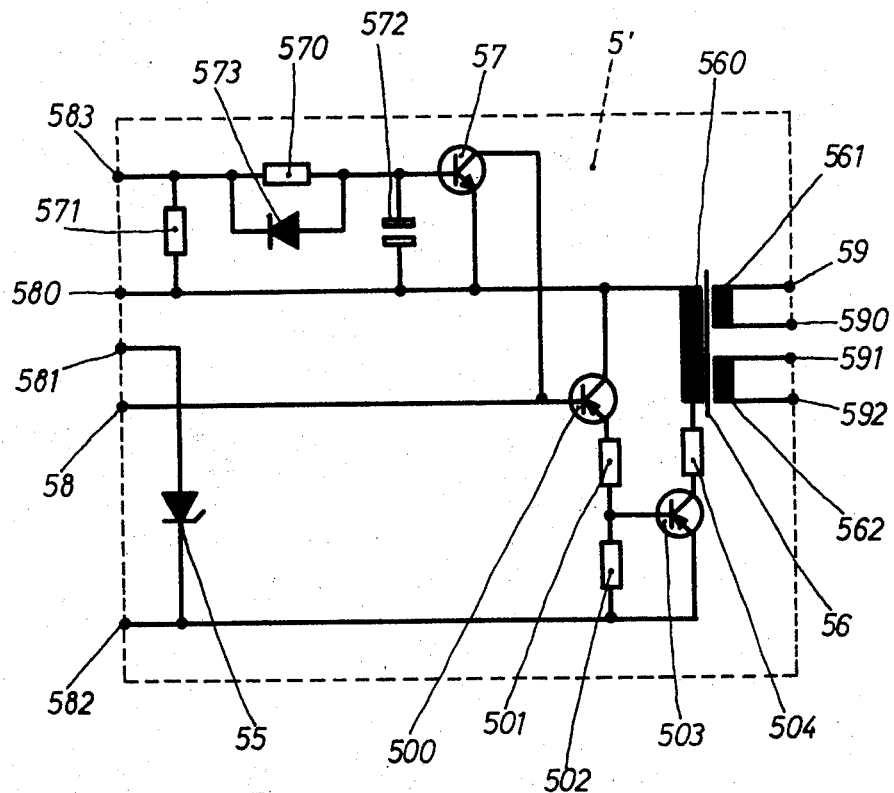
FIG. 15 is a circuit diagram of a matching stage, with whose aid it is possible to provide a complete galvanic separation of apparatus in accordance with the invention from the mains or line supply.

In order to avoid this (however, with the necessity of providing for precise synchronization between the control voltage $U_4$ and the load voltage $U_5$) in accordance with FIG. 15 the matching stage 5', in which firing pulses are produced for the load switch 6, ensures that DC is not produced. For this purpose a limiting diode 55 is provided for the capacitor 31 of the starting or run-up stage 3. This diode 55 ensures that the control voltage $U_4$ does not reach the limiting voltage $U_3$, and is connected via the junction point 581 with the junction point 451 of the limiting value switch stage 4 and via the junction point 402 with the junction point 362 and accordingly with the one side of the capacitor 31 of the starting or run-up stage 3, and via the junction points 582, 452, 400 and 360 with the other side of the capacitor 31 of the starting or run-up stage 3. Accordingly the limiting voltage $U_3$ can only be exceeded by the synchronization voltage $U_1$ or by the control voltage $U_4$ as the sum of the synchronization voltage $U_1$ and the starting or run-up voltage $U_2$, but never by the starting voltage $U_2$ alone.

The transistors 500 and 503 in FIG. 15 serve for amplifying the firing current $I_1$ for the load switch 6, the resistors 501, 502, and 504 only having the purpose of ensuring that no excessive current flows in the transistors 500 and 503.

The amplified igniting or firing current $I_1$ passes to the primary winding 560 of a transformer 56. The firing pulses produced by the synchronization stage 2 produce currents in the secondary windings 561 and 562 which fire the thyristor 60 or 61 respectively of the load switch 6 in accordance with the phase position.

In order to achieve a closely following sequence of pulses during the time in which the threshold value switch stage 4 is in the conducting condition, the collector of a further transistor 57 shown in FIG. 15 is connected with the base line or lead of the transistor 500. The base of the transistor 57 receives, just as is the case with the transistor 500, voltage when the threshold value switch stage 4 is conducting. The base of the transistor 57 is connected via a resistor 570 and the junction points 583 and 453 with the collector of the transistor 41 of the threshold value switch stage 4, while the emitter of the transistor 57 is connected via the junction points 580 and 450 with the threshold switch stage 4. Between the leads connected with the junction points 580 and 583 a further resistor 571 and a capacitor 572 are arranged. The resistor 571 and the capacitor 572 are connected in parallel with each other and are separated by the resistor 570. Parallel to the resistor 570 there is a discharge diode 573 for the capacitor 572.

The matching stage 5' in accordance with the embodiment of FIG. 15 functions in the following manner:

The limiting diode 55 limits the charging of the 10) 31 of the starting or run-up stage 3 (FIG. 1) to a certain predetermined voltage, somewhat below the threshold voltage $U_3$, so that the control voltage $U_4$ can only exceed the threshold voltage $U_3$ with the aid of the synchronization voltage $U_2$. When the limiting value switch 4 becomes conducting the transistor 500 is also conducting so that current is induced in the secondary windings 561 and 562 of the transformer 56. Simultaneously the capacitor 572 is charged up. When the capacitor 572 achieves a certain voltage, the transistor 57 becomes conducting and the capacitor 572 discharges within the switching limits of the transistor 57. Accordingly no more voltage passes to the base of the transistor 500 so that the transistor 500 and 503 pass over into the non-conducting condition. When the lower triggering threshold of the transistor 57 is reached, the latter becomes non-conducting again and the transistor 500 becomes conducting again. This process is continually repeated.

The discharge of the capacitor 572 at that point in time at which there is no voltage at the base of the transistors 500 and 503 occurs with the aid of the discharge diode 573 and the resistor 571. This ensures that, after the threshold switch stage 4 has become conducting again, a pulse does in fact pass via the transformer 56 to the load switch 6 and it is not hindered by the discharge of the capacitor 572 which at this moment is just beginning. Thus this discharge diode 573 is important, particularly at the commencement of the switching-on operation, since at this point in time the firing pulses $I_1$ produced in the threshold value switch stage 4 are extremely short.

The load switch 6 in accordance with FIG. 10) consists of two thyristors 60 and 61 in inverse-parallel configuration. The switch can, however, be made substantially simpler if instead of the two thyristors 60 and 61 a single triac 64 (see FIG. 16) is used. This is possible since a triac has the advantage over thyristors that it comes conducting independently of the direction of flow of the load current $I_2$ on firing, that is to say when a firing current $I_1$ is present at the gate.

Figures 16, 17:
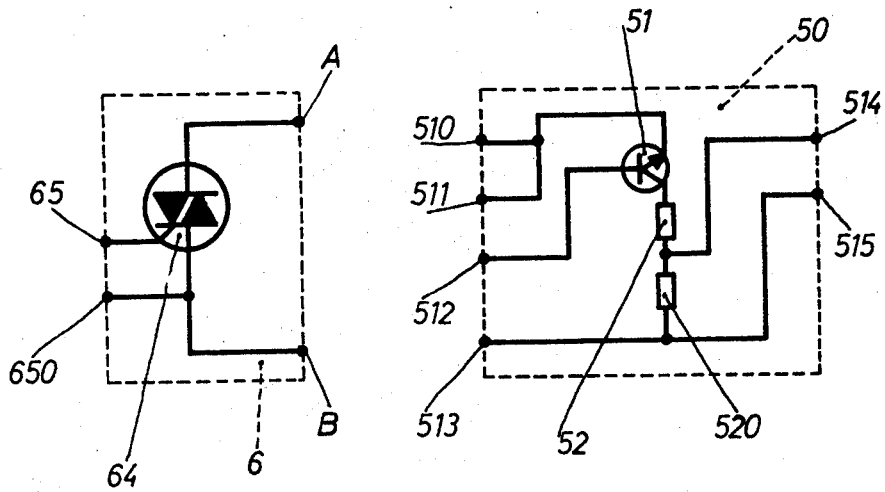
FIG. 16 is a diagrammatic representation of another embodiment of the load switch of apparatus in accordance with the invention.
FIG. 17 is a diagrammatic representation of an amplifier.

If the load switch 6 shown in FIG. 16 is to be galvanically separated from the operating part of the smooth switching-on device 7, the junction point 65 of the load switch 6 is connected with the junction point 59 or 591, respectively, and its junction point 650 is connected with the junction point 590 or 592, respectively, of the matching stage 5' as shown in FIG. 15 and constructed as a multivibrator.

If the firing current $I_1$ is, however, to be supplied as DC to the gate of the triac 64 after starting has been carried out, the matching stage 5 can be completely dispensed with. The triac 64 is in this case connected via the junction point 65 with the junction point 450 and via the junction point 650 with the junction point 45 of the threshold valve switch stage 4.

Usually the firing current $I_1$ for the load switch 6 is too weak and must therefore be amplified. In this case an amplifier 50 is arranged between the threshold value switch stage 4 and the matching stage 5 or in the latter, in accordance with the particular construction adopted.

The amplifier 50 has six junction points 510 to 515. It comprises basically a transistor 51, whose base is connected with the junction point 512 while its collector is connected via two resistors 52 and 520 with the junction points 513 and 515 and its emitter is connected with the junction points 510 and 511. The junction point 514 is connected with the lead running between the resistors 52 and 520.

If the amplifier 50 of FIG. 17 is connected in circuit with the device shown in FIG. 10, the following junction points are to be connected with each other, that is to say: 510 with 450, 511 with 45, 512 with 454, 513 and 452, 514 with 580 and 515 with 58.

If the threshold value switch stage 4 is conducting, the base of the transistor 51 receives voltage and also becomes conducting, so that an amplified firing current $I_1$ is produced by the resistor 52.

Figure 18:
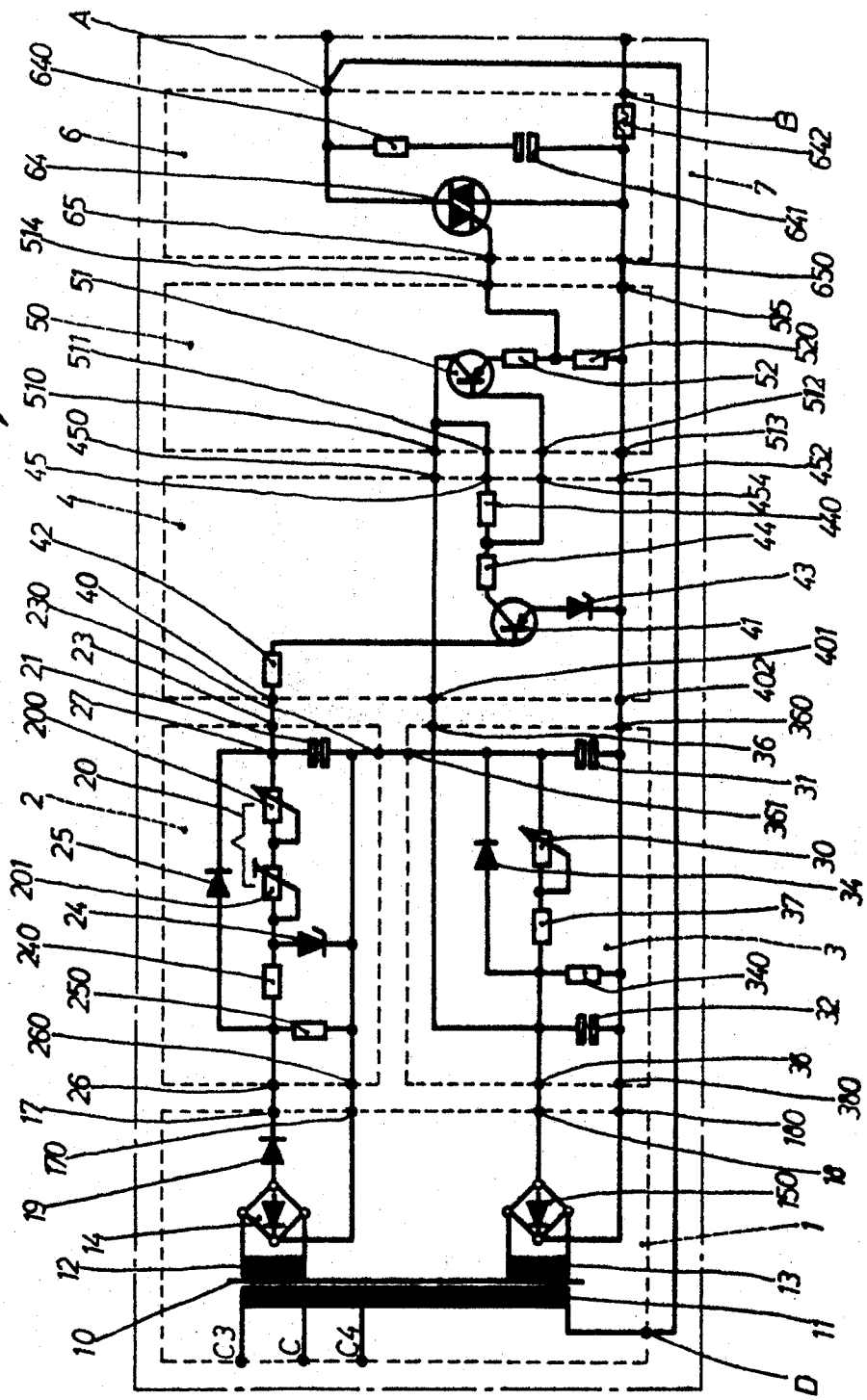
FIG. 18 is a circuit diagram showing the preferred embodiment of apparatus in accordance with the invention.

FIG. 18 shows the preferred embodiment of the smooth switching-on device 7. The current supply device 1 has several connection terminals $C_3$ (for 500 V), C (for 380 V) and $C_4$ (for 220 V), and two rectifying bridges 14 and 150. A Zener diode 19 is provided for the rectifying bridge 14 in order to limit the lowest pass voltage, In this manner long intervals result between the rectified halfwaves of double frequency, and in these intervals no voltage passes to synchronization stage 2. In order to stabilize the supply voltage for the capacitor 21 a Zener diode 24 is provided. Furthermore the selector 20 is in its range extended by the provision of a second adjustable resistor 201, so that adaptation to suit different supply frequencies, for example 50 and 60 cps, is possible. The discharge of the capacitor 21 in the intervals between the halfwaves is made possible by a discharge diode 25 and the resistor 250. In the synchronization stage 2 a saw tooth synchronization voltage $U_1$ is produced. In the starting or run-up stage 3 a capacitor is provided for producing DC. Via a limiting resistor 37 and the selector 30 constructed in the form of a potentiometer this DC charges the capacitor 31, which on switching-off of the smooth starting device 7 discharges via the discharge diode 34 and the discharge resistor 340. Owing to the series connection of the capacitor 31 and the capacitor 21 the synchronization voltage $U_1$ and the starting or run-up voltage $U_2$ formed by the capacitor 31 are added to form the control voltage $U_4$ and supplied via the decoupling resistor 42 to transistor 41, which on a threshold voltage $U_3$ (as determined by the Zener diode 43) being reached becomes conducting. The transistor 51 thus also becomes conducting and supplies an amplified firing current $I_1$ to the triac 64. For protecting the triac 64 a resistor 640 and a capacitor 641 arranged in series are connected in parallel with the triac so that the current reaching it is limited.

The whole smooth switching-on device 7 is fused by means of an ultrahigh speed fuse 642.

The smooth switching-on device 7 in accordance with the present invention is particularly simple in construction and it is very simple to connect it up. It is therefore possible to arrange it in the preexisting supply system of an electrical load 8 or 80 without changing any control elements already present. Accordingly it is possible to arrange the device directly in or on the motor housing. In this case the cooling air circuit of the motor can be used also for cooling the power semiconductors, such as the thyristors 60 and 61 or the triac 64, in the load switch 6.

Since furthermore the smooth switching-on device 7 comprises practically exclusively electronic switching components and no mechanical components, it is practically free of wear.

It is also possible to use the device in accordance with the invention with the same advantage in the case of the smooth switching-on of a DC load 81, for example a DC motor. For this purpose the load is not directly connected between the connection terminals B and E (FIG. 4), but it is connected via a transformer 82 and a rectifying stage or bridge 83 (FIG. 19). In this case the primary winding 820 of the transformer 82 is connected via the connection terminal F with the connection terminal B and via the connection terminal G with the connection terminal E. The current induced in accordance with the load current $I_2$ in the secondary winding 821 of the transformer 82 is rectified by the rectifiers 830, 831, 832 and 833 of the rectifying stage 83 so that the load 81 is provided with pulsating DC in accordance with the load current $I_2$.

Figure 7:
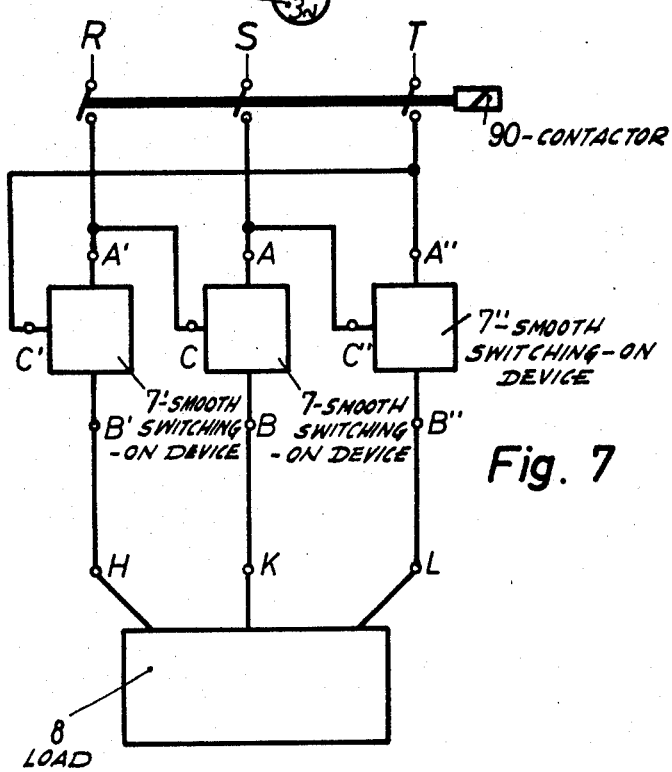
FIG. 7 is a circuit diagram illustrating the connection of apparatus in accordance with the invention with respective phases of a polyphase current supply.

If the DC load 81 is to be connected with a polyphase current supply, as shown in FIG. 20, the connection terminals H, K and L of the polyphase supply of the smooth switching-on device 7 in accordance with the invention as shown in FIGS. 5, 6 and 8, or the smooth switching-on devices 7, 7' and 7'' as shown in FIGS. 7 and 9, are connected to the connection terminals M, N and P, respectively, of the primary side 840 of a polyphase transformer 84. The current induced in the secondary side 841 of such polyphase transformer is again rectified in a rectifying stage 85, which in this case consists of the rectifiers 850 to 855.

The DC load 81 is thus in the case of both embodiments described connected in a manner conventional for single phase and polyphase equipment with the single phase or polyphase supply, the only difference being that on the single phase or polyphase side in one or more phases the smooth switching-on device or devices in accordance with the invention 7, 7' or 7'' equipped with the rectifying stage 83 or 85 is or are provided.

What we claim is:

1. An apparatus for the smooth switching-on of an electrical load including a supply line or main transformer having two secondary windings and a rectifier in circuit with each of the secondary windings, the input of the two rectifiers being electrically separated from each other, comprising a synchronization stage and a run-up stage connected to the outputs of the respective rectifiers, each of said stages including capacitor means, resistor means and at least one adjusting means for varying at least one of said capacitor means and resistor means, said capacitor means of said two stages being connected in series at a connection point for supplying a control voltage, a limiting value switch having its input connected with said connection point, a smoothing capacitor connected between said limiting value switch and said run-up stage for providing a DC voltage, and a load switch having its input connected with said limiting value switch and connected with an electrical load for controlling the voltage supplied to such electrical load.

2. The apparatus defined in claim 1, in which the load switch and the one connection of the supply line or main transformer are connected in a first phase, and the second connection of the transformer is connected in the phase leading such first phase.

3. The apparatus defined in claim 2, in which the load switch is connected in the non-exchanged phase for providing a reversing drive.

4. The apparatus defined in claim 2, in which for each phase a load switch controlled by a synchronization stage and a run-up stage is provided.

5. The apparatus defined in claim 2, in which all connections are arranged between a main contactor and the load.

6. The apparatus defined in claim 4, and a further auxiliary contact for each load switch for reversing operation, actuated in accordance with reversing contactors to avoid phase exchange for the second connection of the supply line or main transformer.

7. The apparatus defined in claim 1, including a phase shifter for the supply line or main transformer.

8. The apparatus defined in claim 1, including a Zener diode arranged between the negative connection point of the rectifier and the synchronization stage.

9. The apparatus defined in claim 1, including a discharge diode connected in parallel with the adjusting means between the capacitor and the current supply device, and a discharge resistor of low ohmic resistance connected in parallel with the rectifier.

10. The apparatus defined in claim 1, including a discharge resistor for the capacitor in the starting stage, and a switch arranged between the smoothing capacitor on the one hand, and the adjusting means and said discharge resistor on the other hand.

11. The apparatus defined in claim 1, including a matching stage between the limiting value switch stage and the load switch, said matching stage having a transformer separating the matching stage electrically from said load switch.

12. The apparatus defined in claim 1, in which the load switch is a triac.

13. The apparatus defined in claim 1, including at least one transformer and a rectifying stage connected between the load switch and the electric load.

* * * * *